(12) United States Patent
Greenhill et al.

(10) Patent No.: US 6,993,103 B2
(45) Date of Patent: Jan. 31, 2006

(54) METHOD FOR SYNCHRONIZING CLOCK AND DATA SIGNALS

(75) Inventors: David J. Greenhill, Portola Valley, CA (US); Tyler J. Thorp, Sunnyvale, CA (US); James Tran, San Jose, CA (US); Gin S. Yee, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 689 days.

(21) Appl. No.: 10/040,169

(22) Filed: Oct. 22, 2001

(65) Prior Publication Data

US 2003/0076909 A1    Apr. 24, 2003

(51) Int. Cl.
*H04L 7/00*       (2006.01)
(52) U.S. Cl. ................................................ 375/354
(58) Field of Classification Search ................. 375/354, 375/371; 327/149, 147, 153
See application file for complete search history.

(56) References Cited

U.S. PATENT DOCUMENTS

| | | | |
|---|---|---|---|
| 6,157,229 A * | 12/2000 | Yoshikawa | 327/149 |
| 6,587,236 B1 * | 7/2003 | Butler et al. | 398/12 |
| 2002/0085657 A1 * | 7/2002 | Boerstler | 375/373 |
| 2002/0181635 A1 * | 12/2002 | Doetsch et al. | 375/354 |
| 2003/0039328 A1 * | 2/2003 | Tomofuji et al. | 375/354 |

* cited by examiner

*Primary Examiner*—Stephen Chin
*Assistant Examiner*—Jia Lu
(74) *Attorney, Agent, or Firm*—Osha Liang LLP

(57) ABSTRACT

A method for synchronizing a data signal and a clock signal has been developed. The method first generates two separate intermediate data signals. The intermediate data signals lag the input data signal. The separate durations of the two lagging signals are combined to form an output data signal that is synchronized with the system clock signal.

16 Claims, 5 Drawing Sheets

METHOD FOR SYNCHRONIZING CLOCK AND DATA SIGNALS

BACKGROUND OF INVENTION

1. Field of the Invention

The invention relates generally to micro-electronic circuitry. More specifically, the invention relates to a method for synchronizing clock and data signals.

2. Background Art

A clock signal is critical to the operation of a microprocessor based computer system. The clock signal initiates and synchronizes the operation of almost all of the components of such a computer system. FIG. 1 shows a prior art overview of a clock distribution system. The computer system 10 broadly includes an input/output ("IO") ring 12 that is part of the microprocessor chip and surrounds the "core" 14 of the system. The system clock signal 16 is fed through the IO ring 12 to a phased locked loop ("PLL") 15 inside the core 14. A PLL is a component that uses feedback to maintain an output signal in a specific phase or frequency relationship with an input signal. In the case of a computer system, a PLL is used to synchronize the microprocessor ("chip") clock with the external ("system") clock. The PLL 15, after synchronizing the system clock signal with the chip clock signal, feeds it to a global clocking grid 18 for the chip. The global clocking grid 18 feeds the signal data/scan paths 30 and 32 and various components such as system latches 22, local clocking grids 20, and a feed back loop 26 that returns to the PLL 15. The local clocking grids 20 feed the base components of the core 14 such as flip-flops 24 which are basic data storage devices.

The end product of the system 10 is the output data 34 during normal operation or scan out data 36 in the case of a scanning test sequence. Each of these system outputs 34 and 36 passes through a clocked storage device 38 and 40 in the I/O ring 12. Since the clock signal in the I/O ring 37 is generally much slower than the clock signal in the core 14, a need exists to synchronize the data 34 from the core 14 with the system clock signal 16.

SUMMARY OF INVENTION

In some aspects, the invention relates to a method for synchronizing a data signal and a clock signal, comprising: generating a first intermediate data signal that lags the data signal; generating a second intermediate data signal that lags the first intermediate data signal; and generating an output signal that combines the duration of the first intermediate data signal and the duration of the second intermediate data signal, wherein the output signal is synchronized with the clock signal.

The end product of the system 10 is the output data 34 during normal operation or scan out data 36 in the case of a scanning test sequence. Each of these system outputs 34 and 36 passes through a clocked storage device 38 and 40 in the I/O ring 12. Since the clock signal in the I/O ring 12 is generally much slower than the clock signal in the core 14, a need exists to synchronize the data 34 from the core 14 with the system clock signal 16.

In other aspects, the invention relates to an apparatus for synchronizing a data signal and a clock signal, comprising: a first data storage device that generates a first intermediate data signal that lags the data signal; a second data storage device that generates a second intermediate data signal that lags the first intermediate data signal; and a multiplexor that generates an output signal that combines the duration of the first intermediate data signal and the duration of the second intermediate data signal, wherein the output signal is synchronized with the clock signal.

In other aspects, the invention relates to an apparatus for synchronizing a data signal and a clock signal, comprising: means for generating a first intermediate data signal that lags the data signal; means for generating a second intermediate data signal that lags the first intermediate data signal; and means for generating an output signal that combines the duration of the first intermediate data signal and the duration of the second intermediate data signal, wherein the output signal is synchronized with the clock signal.

Other aspects and advantages of the invention will be apparent from the following description and the appended claims.

DETAILED DESCRIPTION

Figure 1:
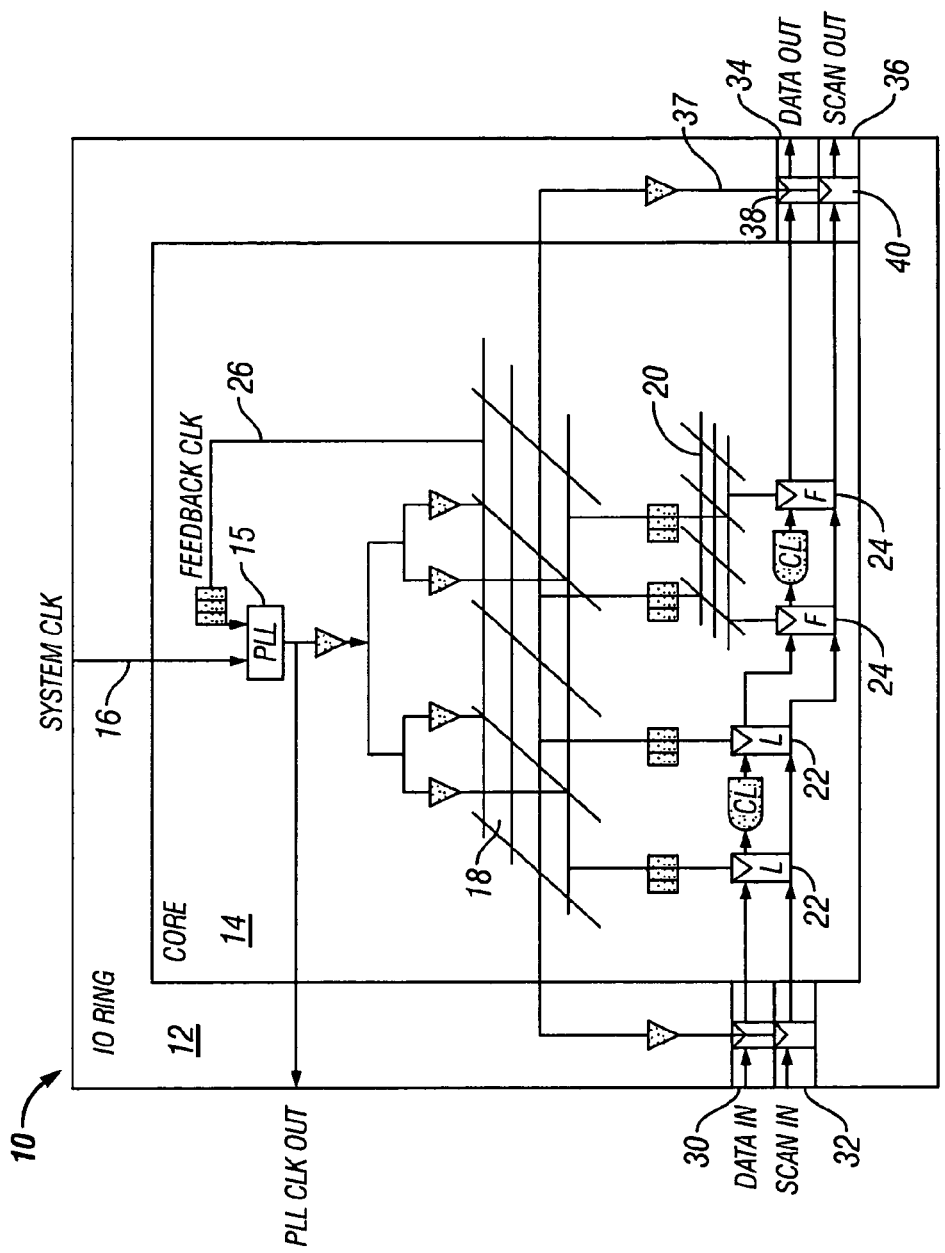
FIG. 1 shows a prior art overview of a clock distribution system.
Figure 2:
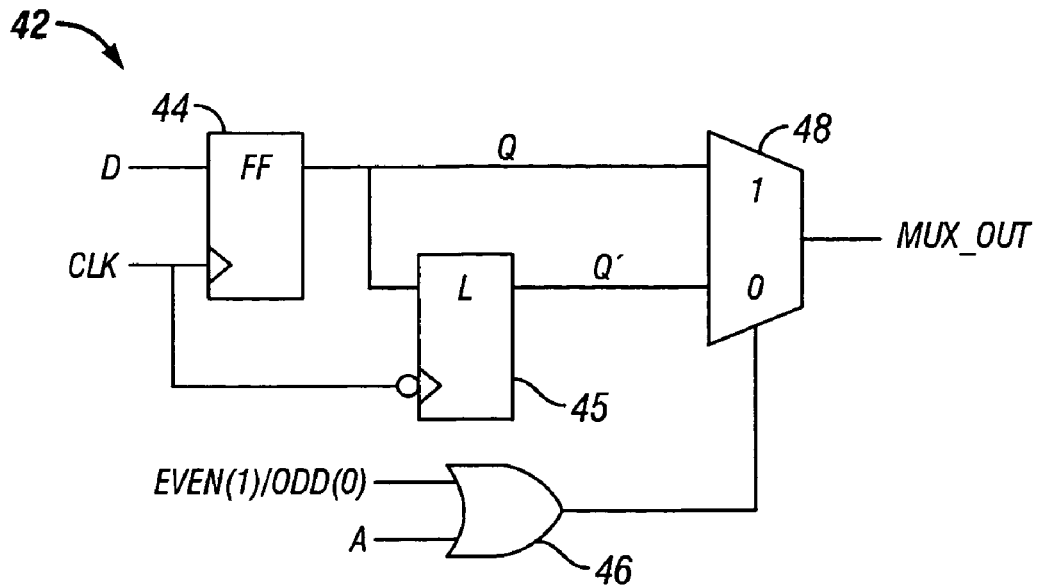
FIG. 2 shows a schematic of one embodiment of the present invention.

FIG. 2 shows a schematic of one embodiment of data/clock synchronization circuit 42. The circuit includes a flip-flop 44 that receives a data signal (D) from the system and is clocked by the I/O clock signal (CLK). The flip-flop 44 outputs a data signal (Q) to a latch 45 that is clock by an inverted CLK signal. The output of the latch (Q') is a data signal that is input to a multiplexor 48 along with the output from the flip-flop (Q). The multiplexor selects either Q or Q' as its output (Mux_out). The selection by the multiplexor is controlled by a signal from an OR gate 46. The inputs to the OR gate 46 are: an alternating data sequence of "1"s and "0"s (Even/Odd) and a synchronization control signal (A). The signal A is generated by a dedicated state machine or other suitable device that is well known in the art.

The circuit 42 generally functions by selecting between the two data signals Q and Q' that are latched during the low and high phases of the reference clock respectively. Since the data is coming from the higher speed core, it is slowed down in order to synchronize with the lower speed I/O clock. The duration of a data bit transmission is lengthened for a number of phases of the I/O clock signal. The number of clock phases that the data signal is lengthened is called the "divide ratio". In the present invention, the divide ratio is controlled by the duration of the control signal A. The value of the divide ratio is generally an integer with a value greater than 1. For an even numbered divide ratio, the Even/Odd signal to the OR gate 46 is "1". This results in the multiplexor 48 passing the value of Q as the Mux_out value. For an odd numbered divide ratio, the Even/Odd signal to the OR gate 46 is "0". This results in the multiplexor 48 alternating between passing the values of Q and Q' as the Mux_out value. The alternating of the multiplexor 48 output is effectively controlled by the value of A. When A is "1", Q is the value of Mux_out and when A is "0", Q' is the value of Mux_out.

Figure 3:
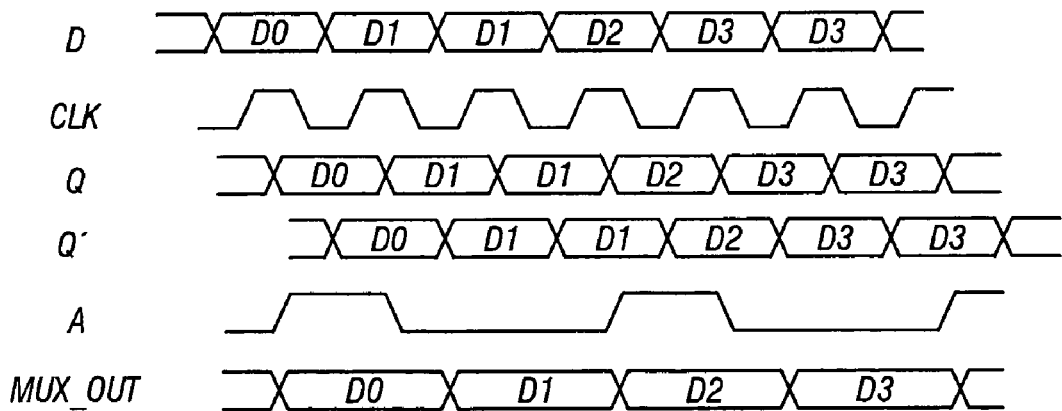
FIG. 3 shows timing diagrams for the circuit shown in FIG. 2.

FIG. 3 shows timing diagrams for the data/clock synchronization circuit 42 shown in FIG. 2 with a divide ratio of "3". In the timing diagrams, the first D value ("$D_0$") is clocked through the flip-flop as the value Q. Q is then clocked through the latch as the value Q' a half cycle later. Since the divide ratio is an odd integer, A controls the value of Mux_out. The signal A remains at a value of "1" during the entire time that Q has a value of "$D_0$". This generates a Mux_out value equivalent to Q. As "$D_0$" transitions to "$D_1$", A goes to a value of "0". This stretches the Mux_out value to include the remaining portion of Q'. The net effect of is that Mux_out produces a "$D_0$" value that lasts through three signal transitions: the rise of "$D_0$" as the value for Q; the rise of "$D_0$" as the value for Q'; and the fall of "$D_0$" as the value for Q.

Figure 4:
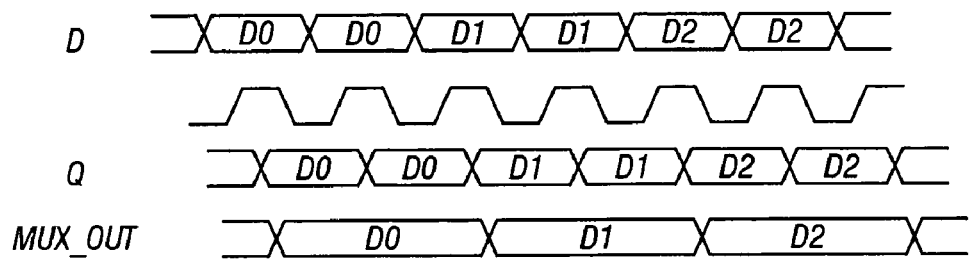
FIG. 4 shows timing diagrams for the circuit shown in FIG. 2.

FIG. 4 shows timing diagrams for the data/clock synchronization circuit 42 shown in FIG. 2 with a divide ratio of "4". In these diagrams, the values of Q' and A are not shown since Mux_out does not depend on their values. Also, the value of the data bit D is repeated for two cycles. With the divide ratio of "4", Q is allowed to continually pass as Mux_out. In these timing diagrams, the first D value ("$D_0$") is clocked through the flip-flop as the value Q. The value of Mux_out follows with a value of "$D_0$". As the "$D_0$" value is repeated through Q, Mux_out maintains the value of "$D_0$". Since the first data bit ("$D_0$") is repeated, the value of Mux_out is stretched to last through 4 signal transitions: the first rise of "$D_0$" as the value for Q; the first fall of "$D_0$" as the value for Q; the second rise of "$D_0$" as the value for Q; and the second fall of "$D_0$" as the value for Q.

Figure 5:
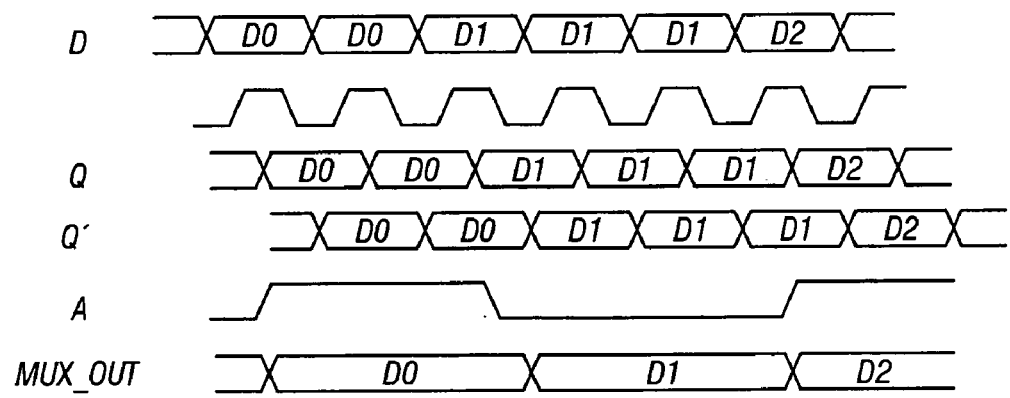
FIG. 5 shows timing diagrams of the circuit shown in FIG. 2.

FIG. 5 shows timing diagrams for the data/clock synchronization circuit 42 shown in FIG. 2 with a divide ratio of "5". As in FIG. 4, the value of the data bit D is repeated for two cycles. In the timing diagrams, the first D value ("$D_0$") is clocked through the flip-flop as the value Q. Q is then clocked through the latch as the value Q' a half cycle later. Since the divide ratio is an odd integer, A controls the value of Mux_out. The signal A remains at a value of "1" during the entire time that Q has a value of "$D_0$"(including the repeated signal). This generates a Mux_out value equivalent to Q. As "$D_0$" transitions to "$D_1$", A goes to a value of "0". This stretches the Mux_out value to include the remaining portion of Q' which is the last half of the repeated "$D_0$" value. The net effect of is that Mux_out produces a "$D_0$" value that lasts through five signal transitions: the transition of "$D_0$" as the value for Q; the transition of "$D_0$" as the value for Q'; the transition of repeated "$D_0$" as the value for Q; the transition of repeated "$D_0$" as the value for Q'; and the transition of repeated "$D_0$" as the value for Q. While the timing diagrams in FIGS. 3–5 have shown embodiments using divide ratios of 3, 4, and 5 respectively, it should be apparent that other divide ratios are possible using these same techniques. For example, in order to use divide ratios of 6 or 7, the value of the data bit D would be repeated 3 times before being applied to the circuit 42.

Figure 6:
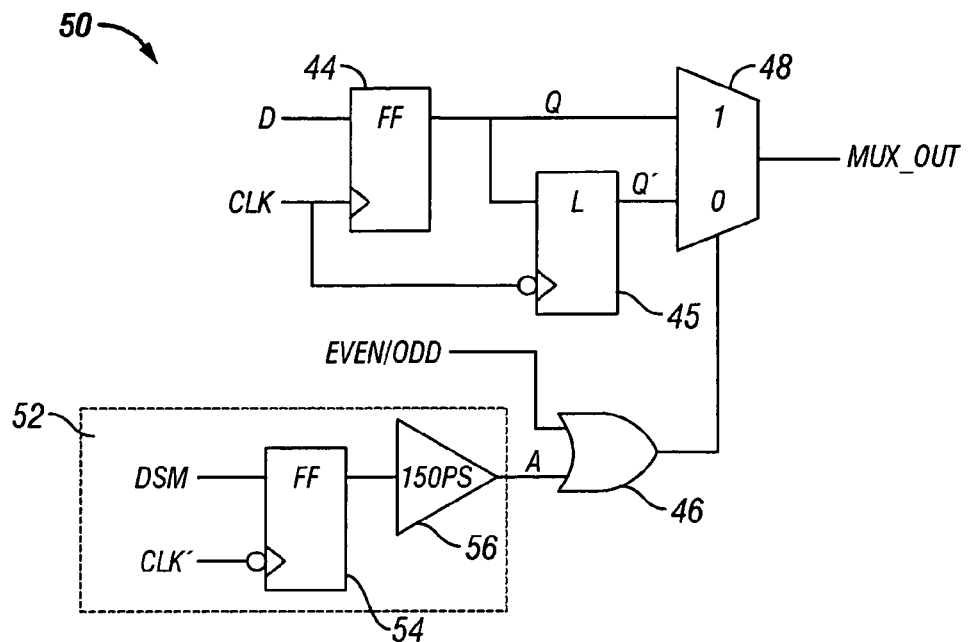
FIG. 6 shows a schematic of one embodiment of the invention that prevents jitter.

The synchronizing control signal A may be designed to be non-blocking and consequently not contribute to either the skew of either the data or clock signals. The signal A may arrive one half of a clock signal early and the circuit will still function correctly. In order to prevent Mux_out from glitching, A should fall after new data is introduced to Q'. FIG. 6 shows a schematic of one embodiment of a data/clock synchronization circuit 50 that prevents jitter that may cause glitching. The circuit 50 is essentially the same configuration as the circuit shown in FIG. 2 except that it includes a synchronization control signal generator 52. The control signal generator 52 generates the signal A by clocking the value from a dedicated state machine (DSM) through a flip-flop 54 that is controlled by an inverted clock signal (CLK'). A buffer 56 then delays the output of the flip-flop 54 before it is used as A by the circuit 50. In the embodiment shown in FIG. 6, delay of 150 ps is added by the buffer 56 to signal A. However, other delay durations could be designed according the needs of the system. The net effect of the signal generator 52 is to ensure that A arrives after new data is introduced to Q'. The skew between the CLK and CLK' signals can be minimized by placing the driven flip-flops and latches of the circuit 50 close together.

Figure 7:
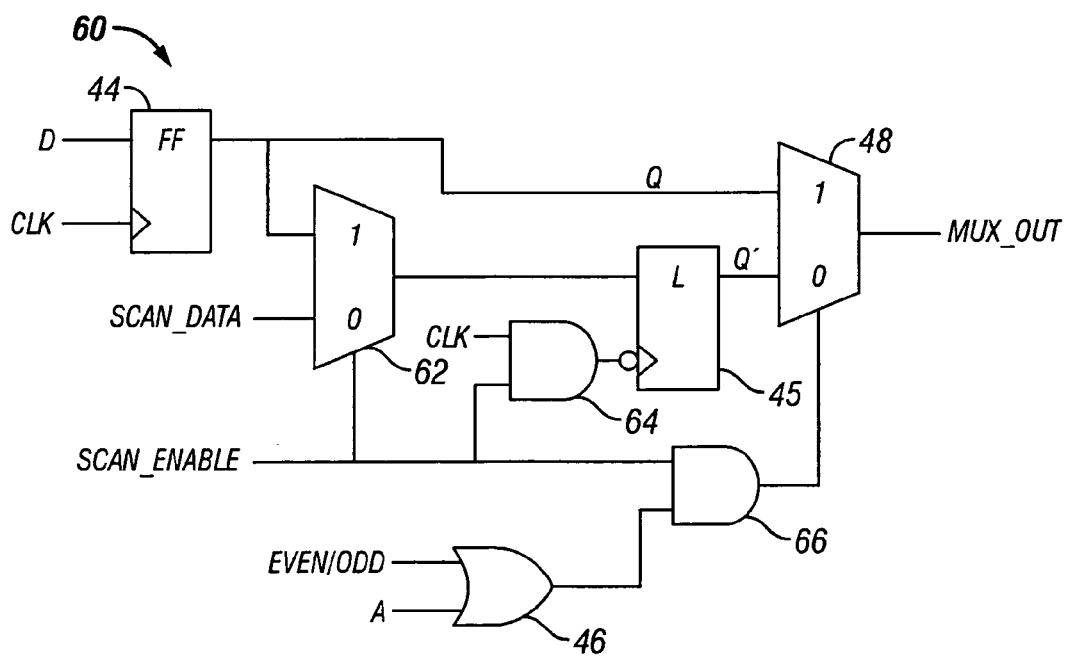
FIG. 7 shows a schematic of one embodiment of the invention for scan operations.

FIG. 7 shows a schematic of one embodiment of a data/clock synchronization circuit 60 that that can be used with scan-in testing operations. Scan-in (or scanning) operations involve disabling the circuit from normal operation and scanning in a test data sequence. The results of the test sequence are analyzed at various points within the system to evaluate the performance of the circuit. The circuit 60 is essentially the same configuration as the circuit shown in FIG. 2 except that it includes an additional multiplexor 62 that is inserted between the flip-flop 44 and the latch 45. Also, an AND gate 64 is inserted before the inverted clock input of the latch 45 and a second AND gate 66 is inserted in front of the OR gate 46 shown in FIG. 2. The additional multiplexor 62 has Q as one input and Scan_data as the other input. Scan_data represents the test data sequence for the scanning operation. The additional multiplexor 62 is controlled by a Scan_enable signal. When the scanning sequence is activated by the Scan_enable signal, the output of the additional multiplexor 62 is Scan_data that is input to the latch 45. Scan_data passes from the latch as the value of Q' and on through the first multiplexor 48 as the value of Mux_out.

Figure 8:
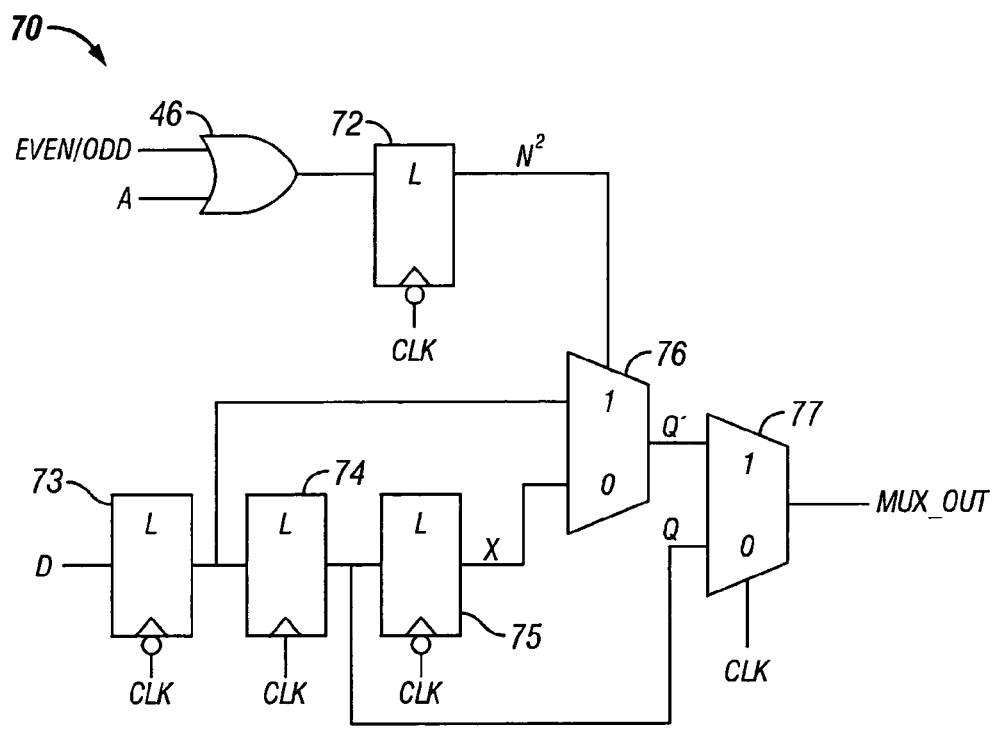
FIG. 8 shows a schematic for an alternative embodiment of the present invention.

FIG. 8 shows a schematic for an alternative embodiment of a data/clock synchronization circuit 70. In this embodiment, the data (D) is input to a first latch 73 whose output is sent separately to a second latch 74 and a first multiplexor 76. The output of the second latch 74 is passed separately to a third latch 75 and a second multiplexor 77 represented as the value Q. The output of the third latch 75 is passed on as the other input to the first multiplexor 76. The output of the first multiplexor 76 is passed on as the other input to the second multiplexor 77 represented as the value Q'. The second multiplexor 77 generates Mux_out according to the CLK signal. The first multiplexor 76 is controlled by the synchronization signal A after it is passed through a fourth latch 72.

Figure 9:
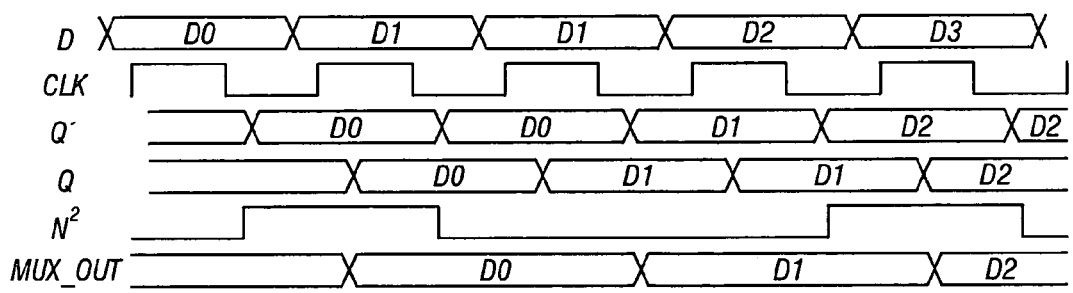
FIG. 9 shows a timing diagram for the alternative embodiment of the present invention shown in FIG. 8.

FIG. 9 shows a timing diagram for the data/clock synchronization circuit 70 shown in FIG. 8 with a divide ratio of "3". Q is clocked through the latch as the value Q a half cycle later. The signal A pulses high for one cycle when the first odd data bit ("$D_1$") is transmitted. This stretches the Mux_out value to include all of Q. The net effect is that Mux_out produces a "$D_0$" value that lasts through three signal transitions: the transition of "$D_0$" as the value for Q'; the transition of "$D_0$" as the value for Q; and the transition of "$D_0$" as the value for Q'.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for synchronizing a data signal and a clock signal, comprising:
generating a first intermediate data signal that lags the data signal; generating a second intermediate data signal that lags the first intermediate data signal; and
generating an output signal that combines the duration of the first intermediate data signal and the duration of the second intermediate data signal, wherein the output signal is synchronized with the clock signal, wherein generating the output signal is controlled by a synchronization signal.

2. The method of claim 1, wherein the synchronization signal controls the output signal with a multiplexor.

3. The method of claim 1, wherein the first intermediate data signal is generated by a flip-flop.

4. The method of claim 1, wherein the second intermediate data signal is generated by a latch.

5. The method of claim 1, wherein the second intermediate data signal lags the first intermediate data signal by one half of a clock cycle.

6. The method of claim 1, wherein the synchronization signal is activated after the second intermediate data signal is generated.

7. A method for synchronizing a data signal and a clock signal, comprising:
step of generating a first intermediate data signal that lags the data signal;
step of generating a second intermediate data signal that lags the first intermediate data signal; and
step of synchronizing the data signal with the clock signal by combining the duration of the first intermediate data signal and the duration of the second intermediate data signal, wherein the step of synchronizing is controlled by a synchronization signal.

8. An apparatus for synchronizing a data signal and a clock signal, comprising:
a first data storage device that generates a first intermediate data signal that lags the data signal;
a second data storage device that generates a second intermediate data signal that lags the first intermediate data signal; and
a multiplexor that generates an output signal that combines the duration of the first intermediate data signal and the duration of the second intermediate data signal, wherein the output signal is synchronized with the clock signal, wherein the multiplexor is controlled by a synchronization signal.

9. The apparatus of claim 8, wherein the first data storage device is a flip-flop.

10. The apparatus of claim 8, wherein the second intermediate data signal lags the first intermediate data signal by one half of a clock cycle.

11. The apparatus of claim 8, further comprising:
a synchronization control signal generator that delays generation of the synchronization signal until after generation of the second intermediate data signal.

12. The apparatus of claim 8, further comprising:
a scanning input device that scans a test pattern to the second data storage device during a testing operation.

13. The apparatus of claim 12, wherein the scanning input device is a multiplexor.

14. The apparatus of claim 13, wherein the multiplexor is controlled by a scanning enablement signal.

15. An apparatus for synchronizing a data signal and a clock signal, comprising:
means for generating a first intermediate data signal that lags the data signal;
means for generating a second intermediate data signal that lags the first intermediate data signal;
and means for generating an output signal that combines the duration of the first intermediate data signal and the duration of the second intermediate data signal, wherein the output signal is synchronized with the clock signal, wherein the means for generating the output signal is controlled by a synchronization signal.

16. The apparatus of claim 15, further comprising: means for scanning in a test data sequence.

* * * * *